US008095161B2

(12) United States Patent
Sandberg

(10) Patent No.: US 8,095,161 B2
(45) Date of Patent: Jan. 10, 2012

(54) SYSTEM AND METHOD FOR DETERMINING A TRANSMIT TIMING FOR COMMUNICATION IN A RADIO COMMUNICATION SYSTEM

(75) Inventor: David Sandberg, Solna (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 337 days.

(21) Appl. No.: 12/547,819

(22) Filed: Aug. 26, 2009

(65) Prior Publication Data
US 2009/0318175 A1    Dec. 24, 2009

Related U.S. Application Data

(63) Continuation of application No. PCT/CN2007/000629, filed on Feb. 28, 2007.

(51) Int. Cl.
*H04B 7/005*    (2006.01)

(52) U.S. Cl. ............... 455/502; 455/115; 455/67.16; 455/67.11; 342/465; 370/507; 370/508; 370/509; 370/510

(58) Field of Classification Search ........... 455/502, 455/404.2, 414.2, 434, 435.2, 440, 441, 452.1, 455/9, 13.2, 515, 181.1, 220, 461, 115, 67.11, 455/67.16; 375/267, 148; 370/349, 104, 370/108, 507, 508, 509, 510, 511, 512, 513, 370/514; 342/465
See application file for complete search history.

(56) References Cited

U.S. PATENT DOCUMENTS

| 4,800,560 | A | * | 1/1989 | Aoki et al. ............. 370/324 |
| 6,016,322 | A | * | 1/2000 | Goldman ............. 370/508 |
| 6,559,796 | B1 | * | 5/2003 | Huber et al. ............. 342/365 |
| 6,947,768 | B2 | * | 9/2005 | Adachi et al. ............. 455/560 |
| 7,103,070 | B2 | | 9/2006 | Khalifa et al. |
| 7,847,734 | B2 | * | 12/2010 | Wu ............. 342/465 |
| 2001/0029131 | A1 | | 10/2001 | Fischer et al. |
| 2004/0260506 | A1 | * | 12/2004 | Jones et al. ............. 702/150 |
| 2008/0004076 | A1 | * | 1/2008 | Adachi et al. ............. 455/560 |

(Continued)

FOREIGN PATENT DOCUMENTS

| WO | WO 2004/114535 A1 | 12/2004 |
| WO | WO 2005/015780 A1 | 2/2005 |

OTHER PUBLICATIONS

International Search Report from P.R. China in International Application No. PCT/CN2007/000629 mailed Dec. 13, 2007.

(Continued)

*Primary Examiner* — Tan Trinh
(74) *Attorney, Agent, or Firm* — Finnegan, Henderson, Farabow, Garrett & Dunner LLP

(57) ABSTRACT

A method for determining a transmission timing is provided. The method includes steps of, at a first point in time, determining a first transmission timing for transmissions from a user entity to a first radio transceiver, and determining a representation of a first position of the user entity in relation to the first radio transceiver and at least a second and a third radio transceiver. The method further includes, at a second point in time, subsequent to the first point in time, determining a representation of a second position of the user entity in relation to the first, second and third radio transceivers, and adjusting the transmission timing based on a difference of the first position and the second position.

23 Claims, 4 Drawing Sheets

U.S. PATENT DOCUMENTS

2009/0310556 A1* 12/2009 Ishii et al. .................... 370/329

OTHER PUBLICATIONS

Texas Instruments, "Non synchronized Random Access structure for E-UTRA", 3GPP TSG RAN WG1 #46bis, R1-062630, Seoul, South Korea, pp. 1-7, (Oct. 9-13, 2006).

Chaffee, et al., "On the Exact Solutions of Pseudorange Equations", IEEE Transactions on Aerospace and Electronic Systems, vol. 30, No. 4, pp. 1021-1030, (Oct. 1994).

Riga, "Uplink synchonization", 3GPP TSG RAN WG2 #56, NTT DoCoMo, Inc., R2-063401, pp. 1-3, (Nov. 6-10, 2006).

* cited by examiner

SYSTEM AND METHOD FOR DETERMINING A TRANSMIT TIMING FOR COMMUNICATION IN A RADIO COMMUNICATION SYSTEM

CROSS-REFERENCE TO RELATED APPLICATION

This application is a continuation of PCT application No. PCT/CN2007/000629, filed on Feb. 28, 2007, titled "System and Method for determining a transmit timing for communication in a radio communication system," the contents of which are incorporated herein by reference in its entirety.

TECHNICAL FIELD

The present disclosure relates to a method for determining a transmit timing in a radio communication system.

BACKGROUND

Wireless mobile radio communication systems are usually cellular, i.e., the total coverage area of such systems is divided into smaller areas wherein each of these smaller areas is associated with a radio base station having one or more radio transceivers for providing communication resources via a radio interface for communication with User Entities (UE), such as mobile phones, smart phones or handheld computers having communication capabilities, located in said area. These areas are usually called cells.

Such communication systems support mobility by allowing the interface between the UE and the network (i.e., connection to a radio transceiver) to move by connecting the UE to different radio transmitters as the UE moves around in the network.

Further, these communication systems also provide mobility in the sense that a user entity can move around within the coverage area of a specific radio transceiver, i.e., the distance from user equipment to the same radio transceiver can change substantially during an ongoing communication.

In some of these systems, a transmission scheme wherein users are multiplexed in both time and frequency is utilized. Such schemes often require that uplink transmissions from different User Entities (UEs) arrive at the base station relatively time aligned in order to fit into a pre-determined time slot structure, so as to avoid transmission collisions.

Physically distributed UEs have different propagation delays to the base station, and, therefore, a method to compensate for these differences is required so as to prevent that data transmitted from these UEs collide at the base station. One example of such a method is to signal a Timing Advance (TA) value from the base station to UE when the network has measured the timing offset. The timing advance value corresponds to the length of time it takes for a signal transmitted from the user entity to reach the base station, and the UE utilizes the TA to determine a suitable transmit timing.

When the UE has become synchronized, i.e., transmission on the communication link (uplink) from UE to base station is synchronized, it will stay synchronized until it is determined to have lost synchronization. This can, for example, be the case if the propagation time changes so that the TA no longer is valid, e.g. by the UE moving further from or closer to the base station. In addition, a UE that moves around in the radio network without using the uplink for a certain time will eventually lose its uplink synchronization due to changes in the relationship between the timing reference of the base station and the internal timing reference of the UE. These changes may, e.g., be due to different accuracies of said timing references.

When a UE needs to re-acquire uplink synchronization, procedures specifically designed for this purpose usually has to be used. Such procedures, however, often have disadvantages.

For example, they can be contention based, and, therefore, only be able to handle a relatively low load before getting congested. This leads to decreased resource utilization. Further, since the UE does not know the exact reception timing at the base station, a substantial amount of guard time has to be used as a margin to other users, which leads to a further decrease in resource utilization.

Therefore, there exists a need for a method for determining transmit timing in a radio communication system that overcomes, or at least mitigates the disadvantages of current synchronization solutions.

BRIEF SUMMARY

According to some embodiments, there is provided a method for determining a transmission timing for communication in a radio communication system, said radio communication system comprising a first radio transceiver, wherein communication from a user entity in a coverage area of said first radio transceiver is carried out in a communication link between said user entity and said first radio transceiver in a synchronized manner, the method comprising in said user entity, at a first point in time, determining a transmission timing for transmissions from said user entity to said first radio transceiver in said communication link, determining a representation of a first position of said user entity in relation to said first radio transceiver and at least a second and a third radio transceiver, and in said user entity, at a second point in time, subsequent to said first point in time, determining a representation of a second position of said user entity in relation to said first, second and third radio transceivers, and adjusting said transmission timing based on a difference of said first position and said second position.

According to some embodiments, there is further provided a system for determining a transmission timing for communication in a radio communication system comprising a first radio transceiver, wherein communication from a user entity in a coverage area of said first radio transceiver is carried out in a communication link between said user entity and said first radio transceiver in a synchronized manner a user entity configured to, at a first point in time, determine a transmission timing for transmissions from said user entity to said first radio transceiver in said communication link, determine a representation of a first position of said user entity in relation to said first radio transceiver and at least a second and a third radio transceiver, and at a second point in time, subsequent to said first point in time, determine a representation of a second position of said user entity in relation to said first, second and third radio transceivers, and adjust said transmission timing based on a difference of said first position and said second position.

Some embodiments as disclosed herein may provide advantages such as the user entity can perform a synchronization, or re-synchronization, without having to consume communication resources of the communication system, thereby having the advantage that signaling regarding synchronization procedures can be substantially reduced in the network.

Further characteristics of the present disclosure and advantages thereof will be evident from the following detailed

DETAILED DESCRIPTION

An embodiment of the present disclosure will now be described with reference to the 3rd Generation Partnership Program (3GPP) work on defining a future cellular communication system, which presently is called the Evolved Universal Terrestrial Radio Access (E-UTRA) or Long Term Evolution (LTE).

Figure 1:
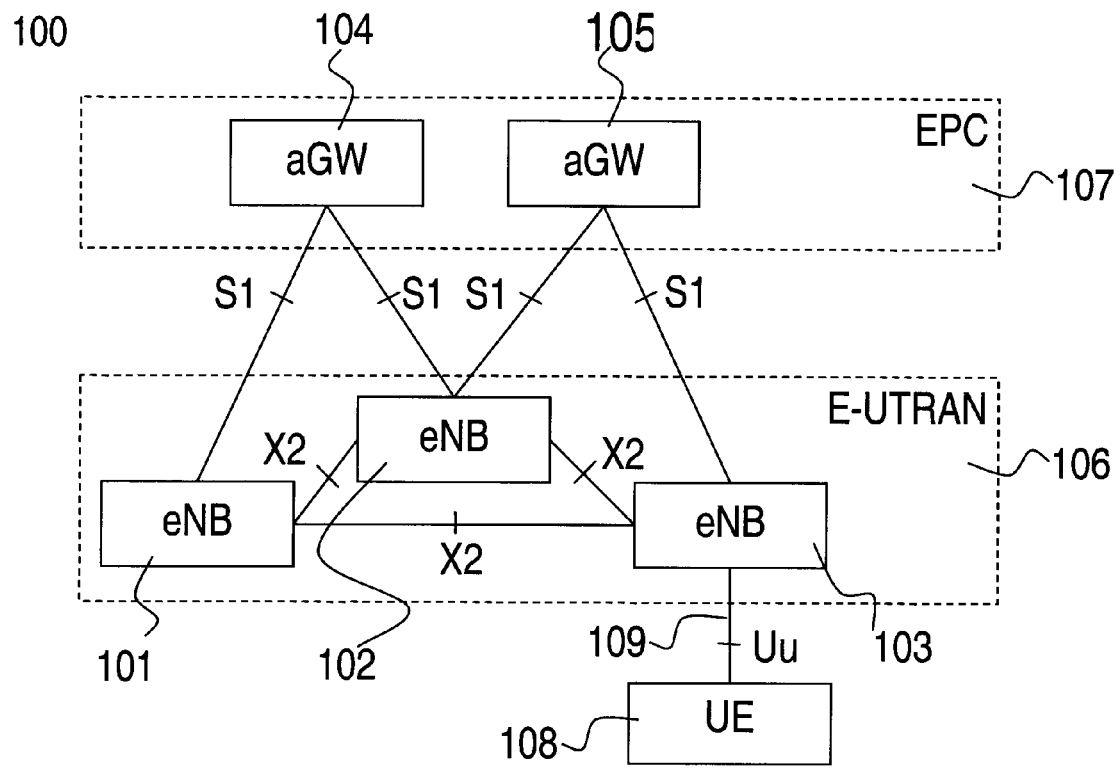
FIG. 1 discloses an example of an Evolved UTRA (E-UTRA) system in which the present disclosure may advantageously be utilized.

An example of the architecture of an E-UTRA system 100 is shown in FIG. 1, and consists of two kinds of nodes, radio base stations (stationary radio transceivers), eNBs (enhanced Node B) 101-103 and aGWs (access GateWay) 104-105, where the eNBs 101-103 belongs to the evolved UTRAN (E-UTRAN) 106 and the aGW belongs to the evolved packet core (EPC) 107. A user entity (UE) 108 connects to the network (E-UTRAN and EPC) by means of a radio interface, Uu interface 109. The eNB 101-103 handles communication over the radio interface in a certain coverage area, i.e., cell, which is the area wherein the radio signal is strong enough to allow a satisfactory communication with UEs within said area.

When the UE 108 moves around in the coverage area provided by the communication system, the UE 108 will move from one cell to another, and thereby an ongoing communication will be transferred from the eNB to which the UE presently belongs, i.e., the serving cell, to the cell into which the UE is entering, i.e., the target cell. This is accomplished by establishing a communication channel on the Uu interface of the target cell, and terminating the communication channel on the Uu interface of the source cell. When a communication is ongoing, the eNB constantly receives transmissions from the UE, and if the eNB determines that the UE needs to adjust its timing advance (TA), e.g., due to an increasing or decreasing distance from the UE to the eNB, a proper TA can be signaled to the UE. However, in many applications data is transmitted from eNB to UE intermittently and not continuously, e.g., when an application has data to transmit to the UE, or when a web page is loaded into a web browser of the user entity. In such situations, the required synchronization between UE and eNB can be lost in the mean time between the data transmissions, as will be described below.

With aim to improve radio access performance, it has been decided to use SC-OFDMA (Single Carrier Orthogonal Frequency Division Multiple Access) for the uplink in E-UTRA. In this scheme, users are multiplexed in both time and frequency, and it is therefore required for the uplink transmissions from different User Entities (UEs) to arrive at the eNB relatively time aligned in order to fit into the pre-determined slot structure.

Figure 2:
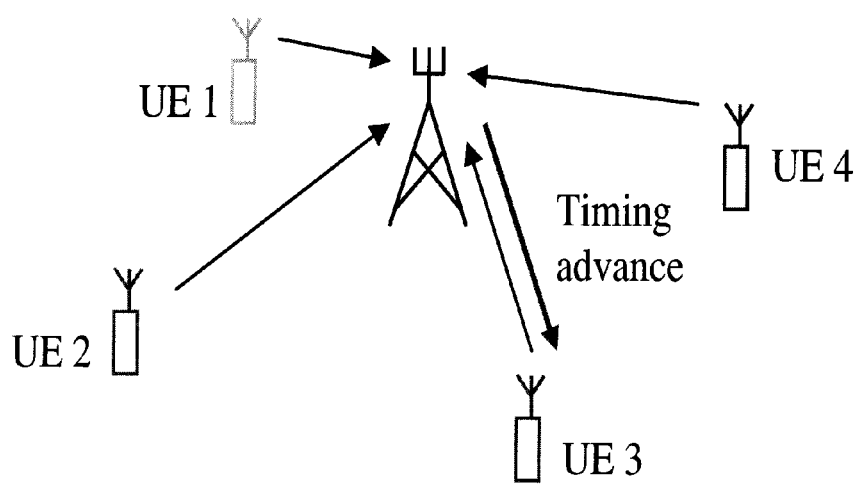
FIG. 2 discloses UEs with different propagation delays in relation to a base station.
Figure 3:
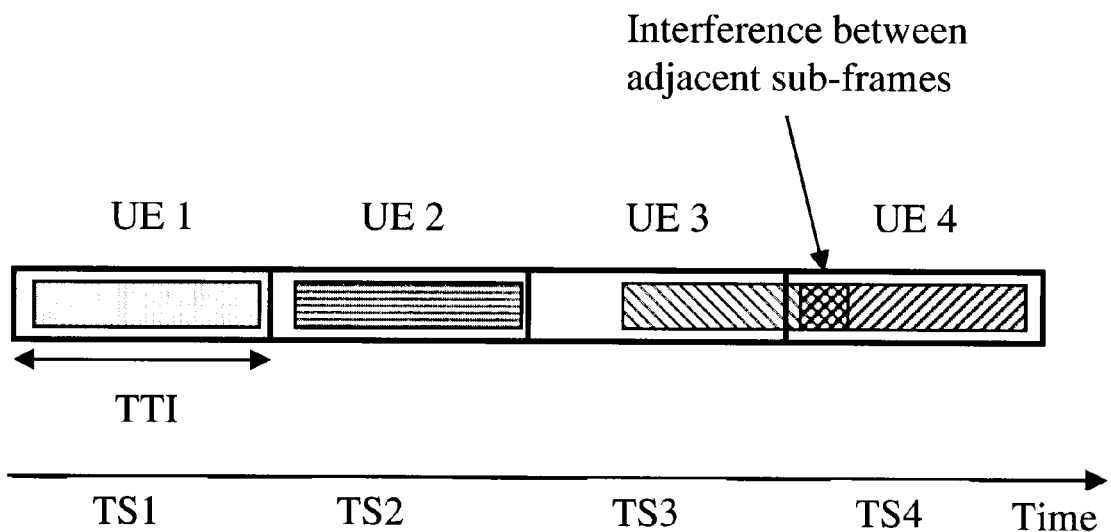
FIG. 3 discloses UEs of FIG. 2 with different propagation delays without proper timing advance.

In the downlink direction, multiplexing is relatively straight forward since users are multiplexed in the base station where the same clock can be used for all users. In the uplink the situation is different since user equipments (UEs) have locally generated reference timing, or clocks, which will differ slightly in frequency between users. Normally, in mobile cellular systems, and which is also the case in the 3GPP E-UTRA system, the timing of the downlink signal is used as a reference in the UE. For example, the UE can use any suitable frame start or end in the downlink scheme as reference, preferably a repetitive frame is used, such as a BCH frame, so as to ensure a proper local time reference at all times, i.e., a determined relation to the serving base station time reference. Before a UE can start uplink (user to base station) transmission, it is required to synchronize (in terms of carrier frequency and timing) to the downlink of the serving base station. Hence, UEs will have access to a relatively stable timing reference, but the receive timing on the base station side will heavily depend on the propagation delay of the signals transmitted from the UE. FIG. 2 shows four UEs distributed in a network with different propagation delays, i.e., the time it takes for a transmission from a UE to reach the base station (eNB). If these differences are not compensated for, substantially concurrent transmissions from different UEs, e.g., UE3 and UE4, will collide with each other in the time domain, with interference between users as a result. This is illustrated in FIG. 3, wherein an example of the SC-OFDMA scheme for a single frequency is shown. As can be seen in the figure, the four UEs, UE1, . . . UE4 are allocated physical resource blocks (PRB) (i.e., time slots) TS1, . . . , TS4, respectively, in which the UEs are allowed to transmit, the length of the transmission being called transmission time interval (TTI). As also can be seen in the figure, UE1 and UE2 are correctly time aligned, i.e. the reception of their transmissions both begin and end within their respective time slots, and consequently, do not disturb transmissions from other UEs. The transmission from UE3, however, started too late, and although its reception starts in TS3, it is not finished until about a fourth into TS4, wherein it collides with the transmission from UE4, and, consequently, corrupts both transmissions. Such a situation arises when UEs, which are physically distributed in the network and have different propagation delays to the eNB, e.g., due to varying distances and/or objects blocking the path to the eNB, start transmissions substantially in an unsynchronized manner. Therefore, a method to compensate for these differences is required in order to avoid situations such as the one disclosed in FIG. 3.

When a UE first accesses the network in the uplink direction, it has no prior information about the propagation delay between the base station and the UE, and hence cannot start uplink transmission without the transmissions being likely to interfere with other users. Further, a UE that moves around in the radio network without using the uplink for a certain period of time will eventually lose its uplink synchronization due to changes in distance from UE to eNB.

Figure 4:
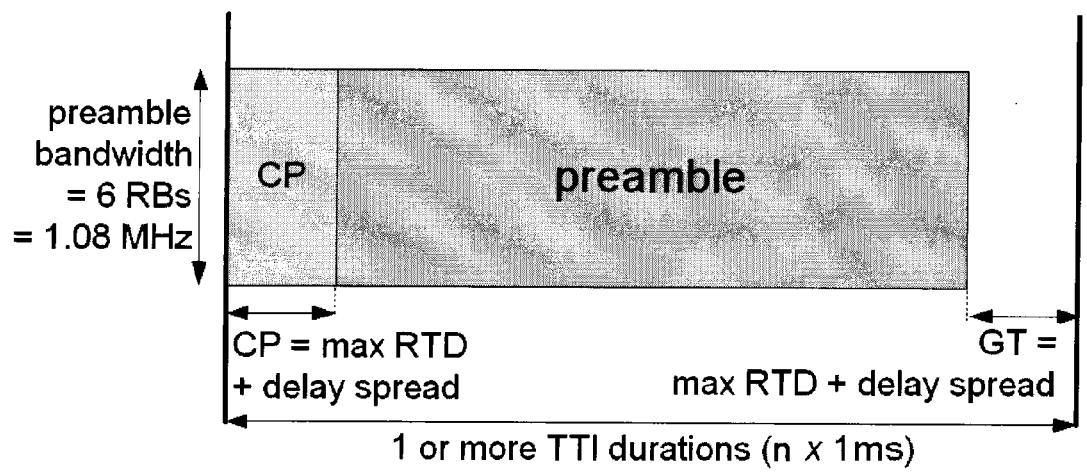
FIG. 4 discloses an example of a Non-Synchronized Random Access Burst (NSRA) procedure.

As was mentioned above, to acquire, or re-acquire, uplink synchronization, a procedure designed for this purpose is used. In E-UTRA, it has been decided to signal a Timing Advance (TA) value from eNB to UE when the network has measured the timing offset using, e.g., a method called Non-Synchronized Random Access (NSRA). Using this method, a non-synchronized UE can access the network without interfering with existing users in the cell and also enable the base station to estimate an uplink timing advance for the UE. NSRA is illustrated in FIG. 4 and will be described in the following.

In E-UTRA, the timing estimation has to be performed by the eNB when measuring a received signal, and this is usually performed during a random access. The eNB can then transmit an appropriate timing advance command to the UE, which then adjusts its uplink transmission timing accordingly.

As was mentioned above, the time domain in SC-OFDM is divided into frames, wherein each frame is divided into the smallest allocatable time periods, i.e., time slots, PRB, which in length substantially correspond to the transmission time intervals (TTI) a UE is allowed to transmit. In the disclosed example, a PRB equals 1 ms. The NSRA requests are transmitted on a Random Access Channel (RACH). RACH resources can be arbitrary located and can consist, e.g., of 1 or more PRBs. There may be a plurality of consecutive PRBs of a single frequency allocated for RACH. Alternatively, or in addition, there may be such RACH resources allocated on a plurality of frequencies. For example, the RACH resources can be periodically recurring, e.g., every 20 ms.

An unsynchronized UE that wishes to establish, or re-establish communication with an eNB transmits an NSRA request, e.g., on such a random access channel (RACH), and an NSRA request contains two parts, a preamble, i.e., a short signal which is sent before the transmission of the second part, a higher layer message. The higher layer message, however, is only transmitted when authorized by the eNB to do so.

To avoid interferences with a following communication resource, i.e., take into account any time synchronization uncertainty to prevent the eNB from receiving a RACH signal during a resource dedicated for data transmission, a guard time is required at the end of the TTI. I.e., the preamble is made shorter than, e.g., 1 ms. The duration of the guard interval should take into account round-trip delay and the delay spread. As can be understood, the required guard time depends on the cell size, the larger the cell size, the longer guard time. As can be seen in the figure, the preamble is also preceded by a cyclic prefix (CP), which has a function corresponding to the guard time.

The shortened preamble, however, will still be enough for the eNB to estimate the receive timing of a certain UE and signal a TA message in accordance therewith for use according to the above. This procedure, however suffers from drawbacks such as that the NSRA is contention based, which means that even if the eNB can handle simultaneous access attempts from more than one UE in a single RACH, it can still only handle a relatively low load before it gets congested, with a decreased resource utilization as result. In addition, the delay until the procedure is finalized can be significant due to the possibility of collisions (a plurality of UEs transmitting simultaneous NSRA requests using the same random access preamble). Further, since the UE does not know the exact reception timing at the eNB, a substantial amount of guard time has to be used as a margin to other users, which leads to a further decreased resource utilization.

Therefore, due to these drawbacks, it is advantageous to keep the amount of required uplink accesses using the NSRA to a minimum, i.e., the time period between synchronizations of a particular UE should be kept as long as possible.

Normally, the network and the UE have the same view on the synchronization status, i.e., whether the UE is synchronized or not, of the particular UE, and currently there are proposed 3GPP methods to determine the synchronization status of a UE. One method involves use of a timer from last timing advance command, wherein the timer is preset to a certain time when a timing advance command is received. When the timer expires, the UE is considered out of sync in the uplink. The timer preset value is static and calculated based on the maximum UE speed that the system is designed for (i.e. 500 km/h for E-UTRA). Alternatively, it is possible to broadcast a cell specific sync-time-out value on BCCH to be able to provide extended sync times for micro cells with relatively low maximum UE speed.

Another method involves use of an adaptive timer, wherein the sync time out value is adapted according to the speed of each UE. The UE estimates the speed using Doppler spread estimation or the frequency of timing adjustment commands, and calculates the required worst case synchronization time out.

When determining strategy for managing uplink synchronization of UEs in a network, there are, basically, two strategies to choose from regarding how uplink synchronization of UEs should be managed, each having advantages and drawbacks.

If UEs are kept synchronized, an advantage is a decreased packet delay since no NSRA procedure is required prior to packet transmission; hence, the load on NSRA is decreased. A major drawback, however, is that uplink resources required to maintain synchronization might be substantial.

If, on the other hand, UEs are allowed to go unsynchronized, no uplink resources are wasted to keep inactive UEs synchronized, this, however, to the cost of an increased packet delay and an increased load on NSRA.

Normally, a suitable mix between the two strategies is probably the most preferable. For example, UEs with frequent activities can be kept synchronized whereas inactive UEs may go unsynchronized. However, in a system like E-UTRA, which is designed to handle high mobility users (i.e., UE speeds up to 500 km/h) the signaling overhead in the uplink due to synchronization can be significant, even though the average UE speed is relatively low. If the UE has moved too far since it received its last timing advance command, the UE may have moved out of sync in the uplink and needs to re-establish it by using a non-synchronized random access (NSRA).

However, if the timer for all UEs is set to the same value, i.e., corresponding to the worst case UE speed, a low mobility UE would still be considered unsynchronized after a relatively short period of time, which, therefore, leads to a undesired reduction in the performance of the network and a possible over-usage of the NSRA.

Some embodiments provide a solution that overcomes, or at least mitigates the disadvantages of current solutions, by providing a method which allows the UE to maintain its uplink synchronization for an extended period of time without the need for uplink transmissions such as NSRA, i.e. the present embodiment provides an alternative to the NSRA, which, at least during certain conditions, provides an accurate enough synchronization.

Figure 5:
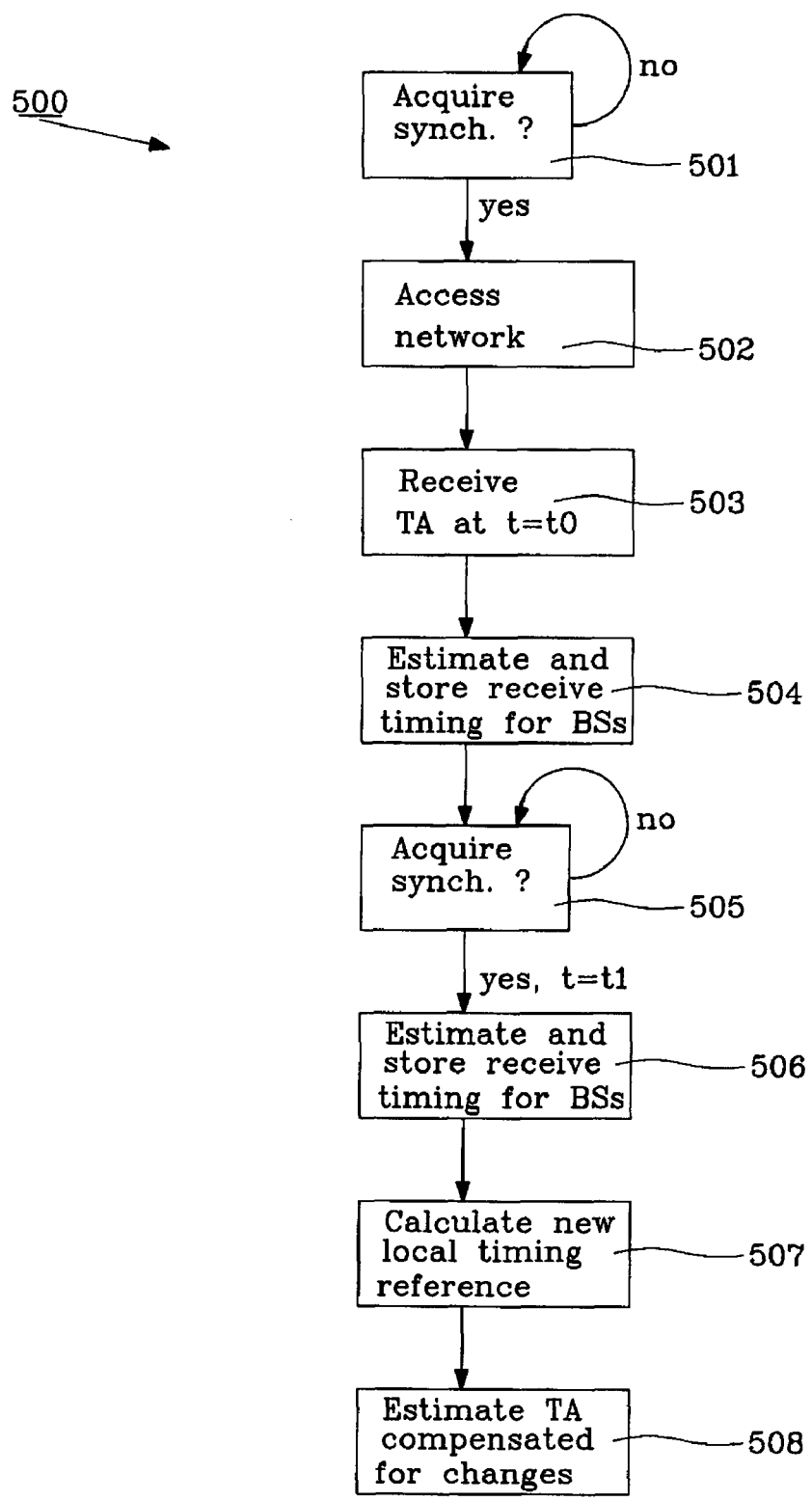
FIG. 5 shows a flow diagram of an embodiment of the present disclosure.

According to the disclosure, this is accomplished by observing and/or comparing the timing of downlinks from at least three different base stations. An exemplary process 500 according to the present embodiment is disclosed in FIG. 5 and, in principal, the method consists of the following:

The process starts in step 501 where it is determined whether the UE is to acquire, or reacquire synchronization with the eNB it presently belongs to. If so, the UE accesses the network (eNB) in the uplink, step 502, e.g., using the non-synchronized random access as described above, and receives a timing advance value TA at t=t0, step 503.

After reception of the timing advance value, the UE estimates and stores the receive timing for at least three different base stations, step 504, including the serving base station providing the timing advance value, in a manner that will be described more in detail below. The actual distances to the neighbor base stations need not be determined, it is enough that the UE determines a receive timing of, e.g., a synch channel of the neighbor base stations. The receive timings are determined with reference to a local time reference of the UE and are then stored in a manner such that their inter-timing relationship can be derived, i.e. the determined receive timings can be considered as (fictitious) distance measures (since no TA is received from a base station other than the serving base station, the actual distance to the neighbor base stations can not be calculated, but in comparing the receive timing from such base stations with the local time reference of the UE a distance representation can be determined. If the base stations are synchronized, an even better distance representation can be obtained by comparing receive timing from the non-serving base stations with the serving base station, since TA is known from the serving base station, and, due to the synchronization, can, when compensated for receive timing differences of the base stations, be used as distance measure for the other base stations).

When the receive timings have been estimated for the synchronized UE, the UE can remain idle, step 505, for a period of time until next uplink activity.

When the UE again needs to transmit uplink data, at a time $t=t1$, it again estimates, in step 506, the receive timing for the said three base stations that was used in step 504. If the UE has moved in relation to its previous position, this will be reflected in a change in the relationship between the timings received from the different base stations at $t0$ and $t1$, respectively, i.e., the (factious) distances from the UE to the respective base stations have changed.

A new local timing reference in the UE is calculated, step 507, according to, e.g., an algorithm such as the one that will be described below. The local timing reference may, e.g., consist of a counter that uninterruptedly counts to a certain value and then starts over again. The local timing, however, usually has such low accuracy that at $t=t1$, the receive timings will not correspond to the same local timing reference as at $t=t0$ even if the UE has not moved. Therefore, the local timing reference must be compensated for these inaccuracies so as to restore the relationship between the local timing reference at UE and timing reference at base station prevailing at $t=t0$.

The process then ends in step 508 by correcting the transmit timing by correcting the change in timing between the serving base station and the (corrected) local timing reference, that is, the timing advance transmitted at $t=t0$ is compensated so that timing advance at $t=t1$ take into account the distance change of the UE determined by observing said receive timings.

This has the advantage that the UE can autonomously reacquire uplink synchronization, and, consequently, reduce load on, e.g., a NSRA channel. The present disclosure has the advantage that, e.g., low mobility mobiles (stationary or pedestrian mobiles) can maintain synchronization for much longer, with a substantial reduction in NSRA attempts, and thereby enhanced system resource usage, as result.

Further, the present disclosure may be particularly advantageous for use in a system wherein it is not required that the system (eNB) is aware of the current synchronization status of the UE. Such a solution is described in detail in a parallel patent application, with the PCT application number PCT/CN2007/000628, the title "System and method for providing communication in a radio communication system", H. Olofsson, M. Roberts, D. Sandberg, which is incorporated herein by reference and assigned to the assignee of the present application and having the same filing date as the present application. In such a system, the network and the UE need not share the same view of the synchronization status; it can be left to the UE to determine for how long it is to be regarded as synchronized.

Consequently, according to the present disclosure, the UE can stay synchronized for much longer as compared to a system wherein a worst case scenario must be taken into account.

In an embodiment, the UE signals its capabilities to keep synchronization for an extended period of time to the base station. The base station can then use this information to decide which UEs that should maintain synchronization and which ones should not. This optimization can also be based on the UEs Quality of Service (QoS) requirement as well as its uplink activity history. The base station then signals to the UE for how long synchronization should be maintained and what method to use for this.

An algorithm for use in the above exemplary method for compensating a timing advance to maintain synchronization will now be described more in detail. In this example, it is assumed that the UE estimates arrival times of three different base stations as above, which will result in three equations.

To derive a local timing reference in the UE, e.g., at $t=t1$, a system of equations containing three unknowns (x, y, dt) and at least three equations (one for each base station) needs to be solved. This can, for example, be accomplished by using the algorithm proposed in Chaffee, J., Abel, J., "On the Exact Solutions of Pseudorange Equations", IEEE Transactions on Aerospace and Electronic Systems, AES-30, No. 4, although these calculations are only exemplary. Naturally, any suitable calculation method can be utilized, as is appreciated by a person skilled in the art.

When using these equations, it is not necessary that the base station geographical coordinates are known, i.e., there is no need to know the actual geographical positions of the base stations. Neither is it necessary to determine propagation delay to any other base station than the serving base station. Instead, the UE timing offset (b) and the UE pseudo-coordinates (x, y) can be, and are, calculated.

Further, it is not necessary to limit the embodiment of the present disclosure to determining timing offset of only three base stations, but the timing offset of any arbitrary number of base stations can be determined. When more base station timing values are present, the equation system will be over-determined and the described method will result in a least squares solution.

Figure 6:
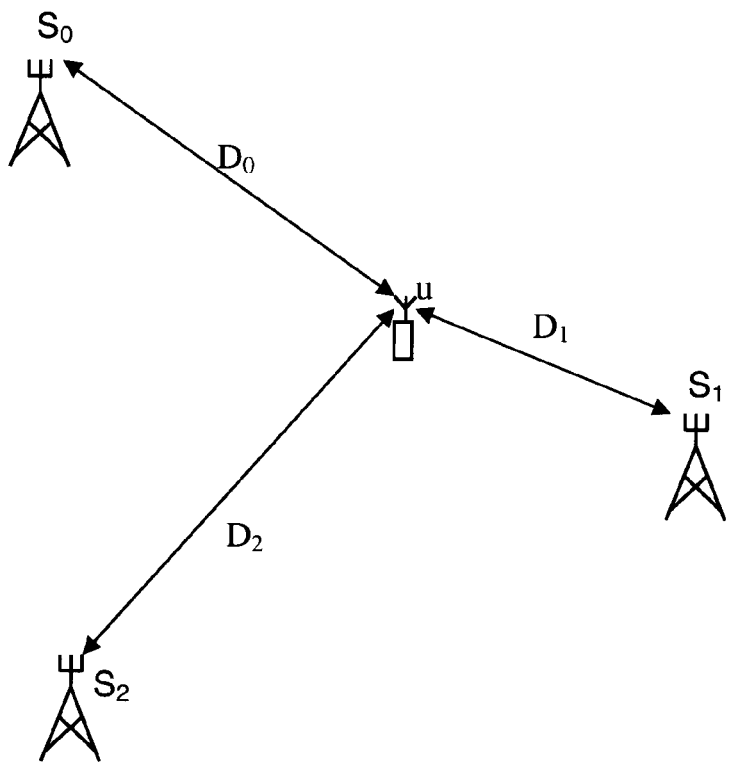
FIG. 6 discloses a UE in relation to a plurality of base stations.

In the calculations below, $S_i$ is the coordinates of a measured base station i, and u is the coordinates of the UE in some arbitrary coordinate system. $D_i$ is the distance between the UE and base station i, (see FIG. 6) can be written as:

$$D_i = \|S_i - u\|$$

Further, $\rho_i$ are the corresponding pseudo-range measurements, i.e., the distance estimations that result from the timing offsets. The timing offsets can, as is understood by a person skilled in the art, be determined based on any suitable reference in the scheme transmitted from a particular base station, i.e., at the start or end of an arbitrarily chosen position in the scheme. In this way, the actual distance to the base station (apart from the serving base station) is irrelevant, since only changes in the timing will be measured, and thereby distance changes will be taken into account.

$\rho_i$ can be written as:

$$\rho_i = \|S_i - u\| + b$$

where b is the local timing offset in the UE, i.e., the inaccuracy imposed to the local timing reference in the UE between t=t0 and t=t1. This equation can then be rewritten as $$\rho_i - b = \|S_i - u\|$$

Squaring both sides and reorganizing the terms results in:

$$(\rho_i - b)^2 = \|S_i - u\|^2 \Rightarrow$$

$$2S_i^T - 2\rho_i b = u^T u - b^2 + S_i^T S_i - \rho_i^2$$

where $\|x\|$ denotes the vector norm of x.

Rewriting this using the Lorentz inner product $\langle \vec{a}, \vec{b} \rangle$ in $\Re^3$, defined as $\langle \vec{a}, \vec{b} \rangle = a_1 b_1 + a_2 b_2 - a_3 b_3$, results in:

$$\left\langle \begin{bmatrix} S_i \\ \rho_i \end{bmatrix}, \begin{bmatrix} u \\ b \end{bmatrix} \right\rangle = \frac{1}{2}\left( \left\langle \begin{bmatrix} u \\ b \end{bmatrix}, \begin{bmatrix} u \\ b \end{bmatrix} \right\rangle + \left\langle \begin{bmatrix} S_i \\ \rho_i \end{bmatrix}, \begin{bmatrix} S_i \\ \rho_i \end{bmatrix} \right\rangle \right)$$

These equations (one for each base station) can then be written in matrix form as $$AZw = \frac{1}{2} \langle w, w \rangle \vec{1} + r,$$

where $$A = [S \ \rho],$$

$$Z = \begin{bmatrix} I & 0 \\ 0 & -1 \end{bmatrix},$$

I being the identity matrix $$\vec{1} = \begin{bmatrix} 1 \\ 1 \\ 1 \end{bmatrix},$$

and r is defined as $$r = \frac{1}{2}\begin{bmatrix} r_1 \\ r_2 \\ r_3 \end{bmatrix}, \text{ where } r_i = \left\langle \begin{bmatrix} S_i \\ \rho_i \end{bmatrix}, \begin{bmatrix} S_i \\ \rho_i \end{bmatrix} \right\rangle$$

Substituting $2\lambda = \langle w, w \rangle$, the above equation can be rewritten as $$Zw = \lambda A^{-1} \vec{1} + A^{-1} r$$

Rewriting this using the Lorentz functional yields $$\lambda^2 \langle A^{-1}\vec{1}, A^{-1}\vec{1} \rangle + 2(\langle A^{-1}\vec{1}, A^{-1}r \rangle - 1)\lambda + \langle A^{-1}r, A^{-1}r \rangle = 0$$

which can be solved for $\lambda_1$ and $\lambda_2$.

Two possible pseudo-positions and timing offsets can then be calculated as $$w = A^{-1}(\lambda \vec{1} + r),$$

where $$w = \begin{bmatrix} u \\ -b \end{bmatrix}$$

is the solution vector, i.e. u is the pseudo-position and b is the local timing offset which is used to compensate the local timing reference so as to compensate for changes in time between the local timing reference and base station reference, as described below. As stated, there will be two solution candidates but the solution closest to the measured base stations should be selected, since this solution is most probable to be the correct solution. It should be noted that when the UE has timing measurements from more than three base stations available, the matrix A will be rectangular and the equation system will be over-determined. In this case, the matrix inverse ($A^{-1}$) should be exchanged for the Moore-Penrose pseudoinverse ($A^+$) defined as $$A^+ = (A^T A)^{-1} A^T,$$

wherein $A^T$ is the transpose of matrix A.

When the UE performs, e.g., a synchronization procedure to synchronize to a base station, the UE is provided with a timing advance, as was disclosed above. This timing advance is used to set a suitable transmit reference, i.e., adjustment of the transmit time so as to ensure proper reception at the base station. Due to limitations in the UE frequency generation precision, the UE cannot keep its uplink synchronization for a very long time if uncompensated (in the order of 0.05 seconds for a 20 ppm oscillator), i.e., the internal timing reference will be fast or slow in comparison to the timing reference of the base station, even in such short time period, with the result that the transmission timing will be lost since timing reference value will no longer be valid.

The uncompensated local timing reference in the UE, $T_{uncomp}$, must therefore be compensated when a period of time has lapsed.

By using the above method, a time offset b is calculated, which is used to compensate the local timing reference, and which can be calculated according to $$T_{comp} = T_{uncomp} + b,$$

where b is the time offset and $T_{comp}$ is the compensated time reference.

At time $t_0$ this time reference $T_{comp}$ is calculated and stored together with the received Timing Advance ($TA_0$). At time $t_1$, when uplink synchronization is to be reacquired, $T_{comp}$ is again calculated. The old TA value is then used to calculate a new TA value according to $$TA_1 = TA_0 + 2(BS_1 - BS_0)$$

where $BS_1$ is the timing of the serving base station measured by the UE (in reference to $T_{comp}$) at time $t_1$. If the local time reference of the UE is not compensated at t=t1, $BS_1$ will be inaccurate, and, therefore, $TA_1$ as well.

Figure 7:
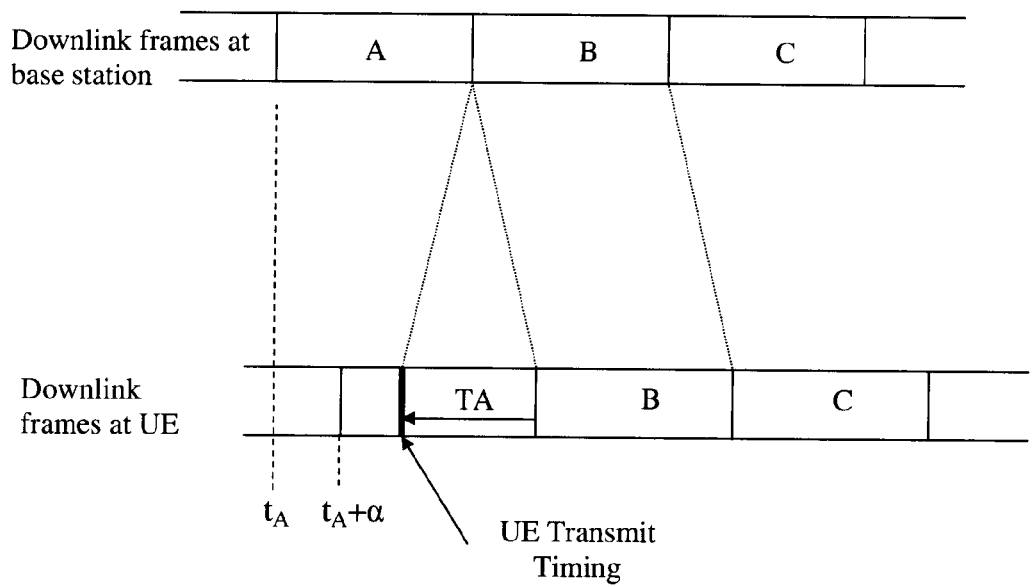
FIG. 7 discloses frame relation of base station and UE with regard to propagation delay.

FIG. 7 illustrates the meaning of Timing Advance with respect to the frame timing at the base station and at the UE.

As can be seen, a frame A beginning at $t_A$ in the base station will, due to propagation delay, be considered to start at $t_A + \alpha$ in the UE. If the UE is allocated frame B for transmission in the uplink, the transmission from the UE will have to start a time TA prior to the point in time at which the frame B starts according to the UE transmit timing, wherein, as stated above, TA is signalled to the UE, e.g., in a NSRA procedure. However, the TA value is only usable for as long as the relation between the internal timing reference of the UE and the internal timing reference of the base station is kept substantially synchronized, i.e., if the internal timing reference of the UE runs slow as compared to the internal timing reference of the base station the transmission will start too late, and the transmission might not end until partly into frame C, e.g., a situation such as the one described for UE 3 in FIG. 3 above. Conversely, if the internal timing reference of the UE runs fast, the transmission may, instead, be received partly in frame A in the base station, which thereby might disturb data transmitted from another UE in that frame.

However, if $T_{uncomp}$ is compensated with the calculated difference b according to the above, the internal timing reference of the UE will be adjusted to again substantially correspond to the relation prevailing at the time the TA was transmitted to the UE, and thereby any difference in the receive timing can be used to compensate the timing advance.

Consequently, provided that the UE is able to measure the downlink timing from at least three different base stations when TA is received and at the subsequent point in time when synchronization is to be reacquired, and provided that at least three of the base stations are the same at both occasions, some embodiments allow a UE to stay synchronized in the uplink for an extended period of time. This is advantageous since the procedure of reacquiring uplink synchronization both reduces performance (in terms of packet delay and UE power consumption) and consumes radio network resources (i.e. increases the load on non-synchronized RACH).

It should be noted however, that the relative timing drift between base stations should be such that it can be regarded as small compared to the time between t0 and t1. If base stations use a common clock this is not a problem, and otherwise the base stations often utilize internal timing references that have very high accuracy.

In an alternative embodiment, the base stations transmit their geographical positions, e.g., on a broadcast channel. In such a solution, it is not necessary to estimate transmit timings of the neighbouring base stations at handover, but it is sufficient to obtain a timing advance from the serving base station at t=t0 and then at t=t1 compensate the obtained timing advance by the change in distance between t0 and t1. In one embodiment, the UE is provided with, e.g., means for receiving signals from a positioning system, such as the Global Positioning System (GPS). In such a solution, the UE need not use signals from other base stations than the serving base stations, at least not if the serving base station transmits its position.

Although the present disclosure has been described in connection to an E-UTRA system, the principles presented in the disclosure also apply to wireless radio communication systems in general, and are therefore applicable in any system wherein a synchronized uplink transmission is required.

Further, the present disclosure has been described for a cellular communication system. It is to be understood, however, that the present disclosure is equally applicable in any system wherein a user entity is movable in relation to at least three radio transceivers, and wherein there is a requirement that the communication from user entity to radio transceiver is synchronized.

What is claimed is:

1. A method for determining a transmission timing for communication in a radio communication system, said radio communication system comprising a first radio transceiver, wherein communication from a user entity in a coverage area of said first radio transceiver is carried out in a communication link between said user entity and said first radio transceiver in a synchronized manner, and the method comprises:

in said user entity, at a first point in time:
determining a transmission timing for transmissions from said user entity to said first radio transceiver in said communication link;
determining a representation of a first position of said user entity in relation to said first radio transceiver and at least a second and a third radio transceiver; and in said user entity, at a second point in time, subsequent to said first point in time:
determining a representation of a second position of said user entity in relation to said first, second and third radio transceivers; and
adjusting said transmission timing based on a difference of said first position and said second position.

2. The method according to claim 1, wherein said representation of said first position comprises a determination of a first relation between a timing reference in a transmission from each of said radio transceivers, respectively, and a first local timing reference in the user entity.

3. The method according to claim 2, wherein said representation of said second position comprises a determination of a second relation between a timing reference in a transmission from each of said radio transceivers, respectively, and a second local timing reference in the user entity.

4. The method according to claim 3, comprising:
compensating said first local timing reference with a time offset by deriving a time offset based on transmissions from said radio transceivers prior to or at said determining of said second relation.

5. The method according to claim 4, wherein said time offset is determined by differences in said second relation with respect to said first relation, or
said compensation is a compensation for the local timing reference of said user entity running fast or slow in relation to the timing reference of said radio transceiver.

6. The method according to claim 3, wherein said relation between transmissions from said radio transceivers and said local timing reference in the user entity is determined by ascertaining an end or a start of a transmission from said radio transceivers in relation to the local timing reference of said user entity.

7. The method according to claim 6, wherein said end or start of a transmission from a radio transceiver is an end or start of any suitable physical resource block or frame transmitted from said radio transceiver.

8. The method according to claim 1, wherein said transmission timing is a timing advance value.

9. The method according to claim 1, wherein communication from one of the radio transceivers to said user entity is transmitted in another communication link different from the communication link between said user entity and said first radio transceiver.

10. The method according to claim 1, wherein said transmission timing is determined by, in said user entity, initiating a synchronization procedure if it is determined that said communication link between user entity and radio transceiver is not synchronized.

11. The method according to claim 10, further comprising:
determining said synchronization status in said user entity based on estimated speed of the user entity and the time since last received timing advance command.

12. The method according to claim 10, further comprising:
determining said synchronization status in said user entity based on the user entity's current position determined by means of a positioning system.

13. The method according to claim 10, further comprising:
  determining said synchronization status in said user entity based on a Non-Synchronized Random Access (NSRA) procedure.

14. The method according to claim 10, further comprising:
  determining said synchronization status in said user entity based on a synchronization procedure comprising:
  signalling to said radio transceiver; and
  said radio transceiver responding to said signalling, said response comprising at least one parameter from which said transmission timing can be determined.

15. The method according to claim 1, wherein said communication link is an uplink.

16. A system for determining a transmission timing for communication in a radio communication system comprising:
  a first radio transceiver, wherein communication from a user entity in a coverage area of said first radio transceiver is carried out in a communication link between said user entity and said first radio transceiver in a synchronized manner;
  a user entity configured to, at a first point in time:
    determine a transmission timing for transmissions from said user entity to said first radio transceiver in said communication link;
    determine a representation of a first position of said user entity in relation to said first radio transceiver and at least a second and a third radio transceiver; and
  at a second point in time, subsequent to said first point in time:
    determine a representation of a second position of said user entity in relation to said first, second and third radio transceivers; and
    adjust said transmission timing based on a difference of said first position and said second position.

17. The system according to claim 16, wherein said representation of said first position comprises a determination of a first relation between a timing reference in a transmission from each of said radio transceivers, respectively, and a first local timing reference in the user entity.

18. The system according to claim 17, wherein said representation of said second position comprises a determination of a second relation between a timing reference in a transmission from each of said radio transceivers, respectively, and a second local timing reference in the user entity.

19. The system according to claim 18, wherein said user entity is configured to:
  compensate said first local timing reference with a time offset by deriving a time offset based on transmissions from said radio transceivers prior to or at said determining of said second relation.

20. The system according to claim 19, wherein said time offset is determined by differences in said second relation with respect to said first relation.

21. The system according to claim 19, wherein said compensation is a compensation for the local timing reference of said user entity running fast or slow in relation to the timing reference of said radio transceiver.

22. The system according to claim 18, wherein said relation between transmissions from said radio transceivers and said local timing reference in the user entity is arranged to be determined by determining an end or a start of a transmission from said radio transceivers in relation to the local timing reference of said user entity.

23. A user entity for use in a system for determining a transmission timing for communication in a radio communication system comprising:
  a radio communication system comprising a first radio transceiver, wherein communication from a user entity in a coverage area of said first radio transceiver is carried out in a communication link between said user entity and said first radio transceiver in a synchronized manner;
  the user entity is configured to, at a first point in time:
    determine a transmission timing for transmissions from said user entity to said first radio transceiver in said communication link;
    determine a representation of a first position of said user entity in relation to said first radio transceiver and at least a second and a third radio transceiver; and
  at a second point in time, subsequent to said first point in time:
    determine a representation of a second position of said user entity in relation to said first, second and third radio transceivers; and
    adjust said transmission timing based on a difference of said first position and said second position.

* * * * *